April 25, 1961
B. B. DRISKO
2,981,900
FEEDBACK MODULATOR
Filed July 24, 1952
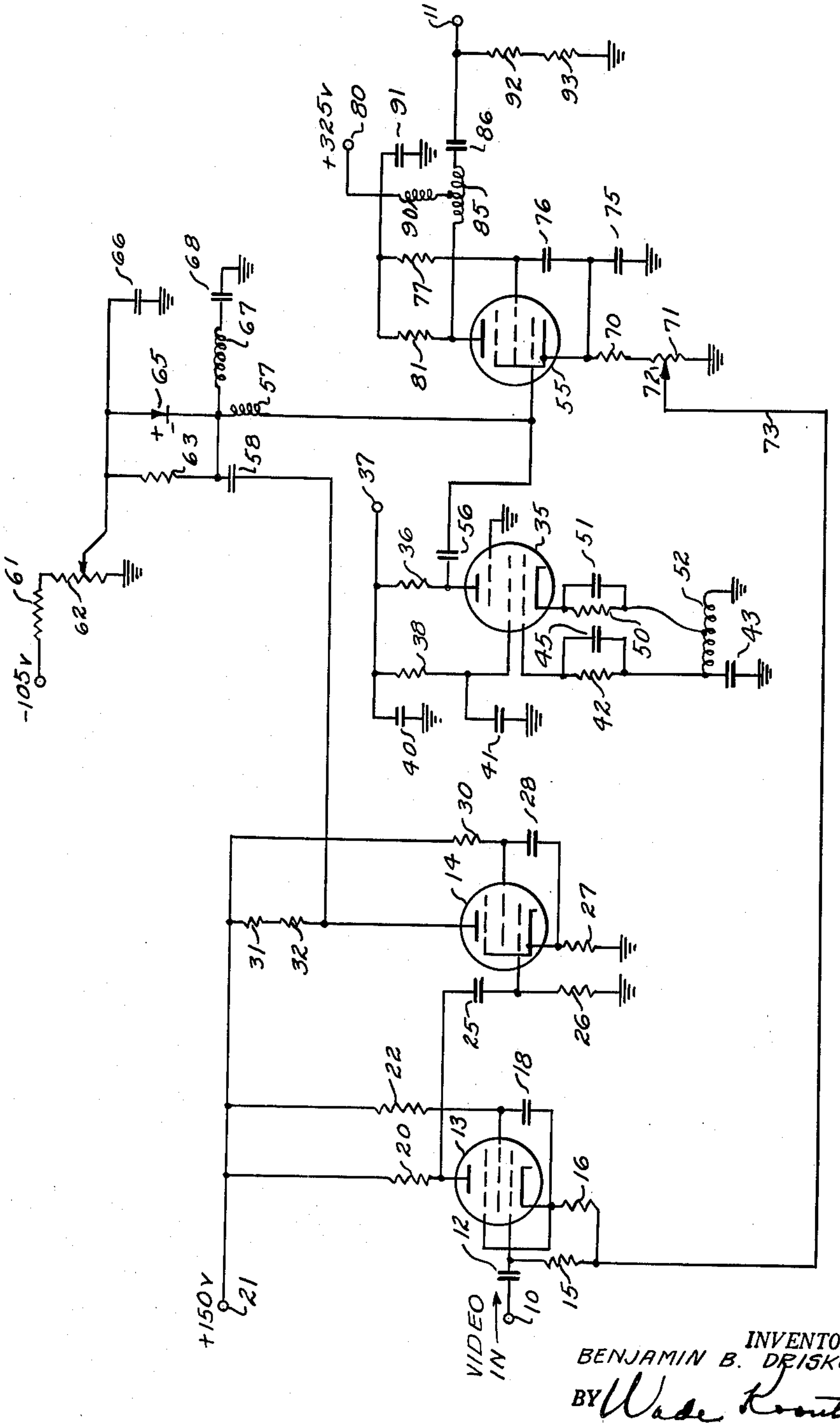
INVENTOR.
BENJAMIN B. DRISKO
BY Wade Koontz AND
Orlando Z. Mosby
ATTORNEYS.

United States Patent Office 2,981,900

Patented Apr. 25, 1961

2,981,900

FEEDBACK MODULATOR

Benjamin B. Drisko, Hingham, Mass., assignor to the United States of America as represented by the Secretary of the Air Force Filed July 24, 1952, Ser. No. 300,633

5 Claims. (Cl. 332—37)

This invention concerns a modulator oscillator power amplifier circuit for use in the field of electronics for impressing video pulses as modulation on a high frequency carrier.

An object of the present invention is to improve the linearity and signal-to-noise ratio of radar receiving modulators.

A modulator is excited by two voltages, commonly a fixed carrier excitation, and a video excitation. The desired output is a carrier whose envelope is a replica of the video.

In the present invention the modulator is treated as a cathode follower as far as video is concerned, the cathode resistor being by-passed for radio frequency but not for video. A video voltage appears on this cathode and is an exact replica of the carrier envelope including any distortions or noise introduced by the modulating process. This video voltage is then fed back into an earlier stage of the video amplifier driving the modulator in such phase as to reduce the above mentioned unwanted effects by the amount of the feedback. This is accomplished in the usual way of feedback by linearizing the circuit elements within the feedback loop.

The advantages of the method of modulation disclosed herein are: The nonlinearities of the parts of the circuit inclosed by the feedback loop are reduced by the amount of the feedback or the differences between the carrier envelope and the input video are diminished by the amount of feedback action. Any noise which normally would be introduced in the components of the modulator in the loop also is reduced by the amount of the feedback. The proper application of negative feedback to such a circuit, if anything, increases the gain band width product.

The above beneficial results are achieved at no extra cost in terms of tubes or power and at a completely negligible cost in terms of additional circuit elements or general circuit complexities which might be reflected as increased testing or adjustment time.

The modulator oscillator power amplifier circuit disclosed herein is a modulator that uses monopolar video. Similar construction with minor circuit changes and the elimination of direct current restorers in an adaptation to coherent systems using bipolar video are within the concept of the present invention.

An illustrative embodiment of the present invention is shown as a schematic circuit in the single figure of the accompanying drawing.

In the drawing a video signal of illustratively 5 volts is applied at an input terminal 10 and appears at the output terminal 11 as radio frequency of 55 volts. The input terminal 10 is coupled through a capacitor 12 with a control grid of a first amplifier tube 13 of the two stage feedback pair of amplifier tubes 13 and 14. The control grid of the amplifier tube 13 is connected through resistors 15 and 16 with the cathode of the same tube. The junction of the two resistors 15 and 16 is connected to ground through a potentiometer tap 71 engaging its resistor 72. The tube 13 illustratively may be a 6AH6 tube and the tube 14 may illustratively be a 6AN5 tube.

The cathode of the tube 13 is connected to the No. 3 grid thereof and through a capacitor 18 with the No. 2 grid of the tube 13. A plate potential of illustratively plus 150 volts is applied through a resistor 20 to the plate of the tube 13 from a potential source 21. The potential source 21 applies its potential also through a resistor 22 to the No. 2 grid of the tube 13.

Input to the control grid of the second amplifier tube 14 is derived from the plate of the tube 13 through a coupling condenser 25. The control grid of the amplifier 14 is connected to ground through resistor 26. The cathode and the No. 3 grid of the tube 14 are connected together and are connected to ground through resistor 27. The No. 2 grid of the tube 14 is connected through a capacitor 28 to the cathode of the same tube. The No. 2 grid of the amplifier tube 14 is connected through a resistor 30 to the plus 150 voltage source 21. The plate of the amplifier tube 14 derives its potential through resistors 31 and 32 from the plus 150 volt potential source 21.

As oscillator tube 35 provides a frequency for the circuit and is supplied its plate voltage through a resistor 36 from a potential source 37. The oscillator tube 35 illustratively may be a 6AH6 tube.

The potential source 37 is connected through resistor 38 with the No. 2 grid of the oscillator tube 35. Both ends of the resistor 38 are grounded in parallel through capacitors 40 and 41. The No. 3 grid of the oscillator tube 35 is connected directly to ground. The control grid of the tube 35 is connected to ground through series connected bias resistor 42 and capacitor 43. The resistor 42 is shunted by capacitor 45. The junction of the resistor 42 and the capacitor 43 is connected to ground through a coil 52. The cathode of the oscillator 35 is connected to ground through a resistor 50 shunted by capacitor 51 and a portion of the coil 52 that may be variable if preferred.

The power amplifier tube 55 has its control grid coupled through a capacitor 56 with the plate of the oscillator tube 35 and through a coil 57 in series with the capacitor 58 with the plate of the second amplifier tube 14. Bias for the control grid of the amplifier tube 55 is supplied through a crystal filter containing coupling circuit of high selectivity and a very high Q from a negative potential source 60 of illustratively minus 105 volts through series connected resistor 61, potentiometer 62, resistor 63 and coil 57. The resistor 63 is shunted by a crystal 65 with its positive side grounded through a capacitor 66 and its negative side grounded through a coil 67 in series with a capacitor 68.

The cathode of the power amplifier tube 55 is connected to ground through a resistor 70 in series with the potentiometer resistor 72. The potentiometer tap 71 adjustably engages the potentiometer resistor 72 in the cathode circuit of the tube 55. The lead 73 of the potentiometer tap 71 returns video signal feedback potential through the resistors 15 and 16 to the grid and cathode, respectively, of the first amplifier tube 13. The use of the video feedback linearizes the output of the master oscillator power amplifier. The cathode of the power amplifier tube 55 is connected to ground through a capacitor 75 that provides a by-pass to ground for radio frequency energy but not for video.

The power amplifier tube 55 has its No. 2 grid connected to the tube cathode through a capacitor 76 and is connected through resistor 77 with a plus 325 volt power source 80. The power source 80 supplies plate potential through resistor 81 to the plate of the power amplifier tube 55. The modulation power amplifier 55 illustratively may be a vacuum tube that commercially is designated 829B.

The plate of the tube 55 is connected to the circuit output terminal 11 through a coil 85 in series with a capacitor 86. The coil 85 is tapped by another coil 90 from the power source 80 that is connected to ground through a capacitor 91. The circuit output terminal 11 is connected to ground through series connected resistors 92 and 93.

Operatively, a 5 volt input at the circuit input terminal 10 is amplified to a 55 volt radio frequency output at the circuit output terminal 11. The oscillator circuit, of which the oscillator tube 35 is a part, supplies a frequency to the control grid of the power amplifier tube 55 along with the output from the plate of the amplifier tube 14. The control grid of the power amplifier tube 55 has its bias supplied from the negative potential terminal 60 and the intervening circuitry. The radio frequency is by-passed to ground through the capacitor 75.

Modulation is fed into the grid return of the power amplifier 55 from the two stage feedback pair of amplifiers 13 and 14. The feedback voltage is obtained from the cathode resistor potentiometer 71, 72 in the cathode circuit of the power amplifier 55 which is by-passed for radio frequency by the capacitor 75 but not for video.

In the amplitude modulation circuit in the drawing it will be noted that the modulation is all positive and that, in the absence of modulation, the carrier or radio frequency should be small or zero. This result is accomplished by operating the power amplifier tube 55 essentially class B rather than the usual class C and by applying direct current restoration in the grid return of the power amplifier tube 55 so that video-wise the grid cannot be driven negative but can be driven only positive or in such direction as to increase the output.

In a class B amplifier the output current, or the alternate current component of the plate current, is proportional to the amplitude of the exciting grid voltage. Power is proportional to the square of the current and hence the power output of a class B amplifier is proportional to the square of the exciting grid voltage. In class B service the grid bias is set so that the plate current is relatively low without grid excitation and the exciting signal amplitude is made such that the entire linear portion of the characteristic of the tube is used.

In a class C amplifier the alternating component of the plate current is directly proportional to the plate voltage. The output power of a class C amplifier is proportional to the square of the plate voltage. Characteristics of class C operation are high plate efficiency, high power output and relatively low power amplification.

In the disclosed circuit there is about 20 decibels video feedback which linearizes the output of the master oscillator power amplifier. Since the grid of the amplifier 55 is not driven positive, no series repetition rate, sensitivity or direct current restoration problems appear in the operation of the circuit.

It is to be understood that the circuit and components that are shown and disclosed herein have been submitted for the purposes of illustrating and describing a representative embodiment of the present invention and that limited substitutions and modifications may be made therein without departing from the scope of the present invention.

What I claim is:

1. A modulator oscillator power amplifier increasing the amplitude of an input potential from an input terminal for availability at an elevated potential at an output terminal, comprising a first amplifier electronic vacuum tube having a plate and a cathode and a plurality of grid electrodes, a coupling capacitor between the input terminal and the control grid of said first amplifier tube, resistor means between the control grid and the cathode electrodes of said first amplifier, a capacitor between the cathode and the number two grid of said first amplifier and to which cathode the number three grid of said amplifier is connected, a positive first potential source, resistor means between said first potential source and the plate electrode of said first amplifier tube, resistor means between said first potential source and the number two grid of said first amplifier tube, a second amplifier tube having plate and cathode and a plurality of grid electrodes, a coupling capacitor connecting the plate of said first amplifier tube with the control grid of said second amplifier tube, a resistor connecting the control grid of said second amplifier tube with ground, a resistor connecting the cathode and the number three grid electrodes of said second amplifier tube with ground, a capacitor connected between the cathode and the number two grid electrodes of said second amplifier tube, resistor means between said first power source and the number two grid of said second amplifier tube, resistor means between said first power source and the plate of said second amplifier tube, an oscillator vacuum tube having plate and cathode and a plurality of grid electrodes, a second potential source, a resistor between said second potential source and the plate electrode of said oscillator tube, resistor means having both of its ends capacitively connected with ground and itself connected between said second potential source and the number two grid electrode of said oscillator tube, a capacitor shunted resistor connected in series with a capacitor between the control grid of said oscillator tube and ground, a capacitor shunted resistor in series with a portion of an inductor connected between the cathode electrode of said oscillator tube and ground and through the remaining portion of the inductor and the control grid capacitor shunted resistor to the control grid of said oscillator tube, a ground connection for the number three grid of said oscillator tube, a power amplifier tube having a plate and a cathode and having a plurality of grid electrodes with the cathode and number three grid electrodes connected together, a capacitor coupling the control grid of said power amplifier with the plate of said oscillator tube, a radio frequency by-passing capacitor between the cathode of said power amplifier and ground, a capacitor between the cathode and the number two grid electrodes of said power amplifier tube, resistor means inclusive of a potentiometer resistor between the cathode of said power amplifier and ground and the potentiometer resistor adjustably engaged by a movable tap connected with the resistor at the control grid and the cathode electrodes of said first amplifier tube, a negative third power supply connected through a resistor and a potentiometer resistor to ground with a variable tap engaging the potentiometer resistor, a crystal having positive and negative terminals with its positive terminal connected to said last mentioned potentiometer tap and the crystal negative terminal connected through an inductor with the control grid of said power amplifier, a resistor shunting the terminals of said crystal, capacitor means connected between the positive terminal of said crystal and ground, an inductor in series with a capacitor connected between the crystal negative terminal and ground, a capacitor connected between the crystal negative terminal and the plate of said second amplifier tube, a capacitor between the cathode and the number two grid of said power amplifier, a positive fourth power supply, a capacitor between said fourth power supply and ground, resistor means between said fourth power supply and the plate of said power amplifier, resistor means between said fourth power supply and the number two grid of said power amplifier, inductor-capacitor means between said fourth power supply and said output terminal, and resistor means connecting said output terminal with ground.

2. A modulator oscillator power amplifier circuit, comprising an input terminal supplying video pulses to the circuit, a first amplifier vacuum tube having a control grid electrode capacitively coupled to the input terminal and also having plate and cathode electrodes, a second amplifier tube having a control grid electrode capacitively coupled with the plate electrode of the first amplifier tube and with a fixed bias and the second amplifier tube also having plate and cathode electrodes, an oscillator having a plate electrode from which a frequency is supplied to the circuit through a capacitor coupling, a modulator power amplifier vacuum tube having a control grid electrode capacitively coupled with to receive oscillator frequency from the plate electrode of the oscillator and the modulator vacuum tube control grid electrode coupled to receive second amplifier tube amplified video pulse plate electrode output through series connected capacitor and coil means and the modulator vacuum tube having a plate electrode and a cathode electrode, a variable feedback loop connecting the cathode electrode of the modulator tube through series connected resistor and a potentiometer variable tap resistively coupled with the input grid of the first amplifier tube, and a circuit output terminal coupled through series connected coil and capacitor means with the modulator plate electrode for providing video modulated radio frequency output for the circuit.

3. The circuit in the above claim 2 inclusive of capacitor means coupling the modulator cathode electrode to ground and keeping radio frequencies out of the feedback loop.

4. The circuit in the above claim 2 wherein the feedback loop potentiometer variable tap is resistively coupled with both the control grid electrode and the cathode electrode of the first amplifier tube for returning feedback from the cathode of the modulator tube to both the control grid electrode and to the cathode electrode of the first amplifier tube.

5. The circuit in the above claim 2 wherein the control grid electrode of the power amplifier vacuum tube is connected through a series connected coil and resistor shunted crystal to a variable tap on a negatively powered potentiometer.

References Cited in the file of this patent

UNITED STATES PATENTS

| | | |
|---|---|---|
| 2,379,042 | Shaw | June 26, 1945 |
| 2,469,803 | Weathers | May 10, 1949 |
| 2,490,428 | Gluyas | Dec. 6, 1949 |
| 2,519,256 | Lee | Aug. 15, 1950 |
| 2,519,305 | Young et al. | Aug. 15, 1950 |

OTHER REFERENCES

"Audio Feedback Design," Cooper, Radio-Electronics, September 1951, pages 65, 66, and 68.